US008162561B2

(12) United States Patent
Pilja

(10) Patent No.: US 8,162,561 B2
(45) Date of Patent: Apr. 24, 2012

(54) INTEGRATED JOINER IMPROVEMENTS

(76) Inventor: Milan Pilja, Woodville West (AU)

( * ) Notice: Subject to any disclaimer, the term of this patent is extended or adjusted under 35 U.S.C. 154(b) by 77 days.

(21) Appl. No.: 12/490,513

(22) Filed: Jun. 24, 2009

(65) Prior Publication Data

US 2010/0296861 A1 Nov. 25, 2010

(30) Foreign Application Priority Data

May 19, 2009 (AU) ................ 2009100469

(51) Int. Cl.
*F16B 17/00* (2006.01)
(52) U.S. Cl. ....... 403/408.1; 403/DIG. 10; 403/DIG. 12
(58) Field of Classification Search .......... 403/259, 403/260, 374.4, 408.1, DIG. 12, DIG. 13; 411/104, 402
See application file for complete search history.

(56) References Cited

U.S. PATENT DOCUMENTS

| 571,042 | A | * | 11/1896 | Edquist ........................... 403/8 |
| 4,685,848 | A | * | 8/1987 | Langer ........................ 411/402 |
| 4,783,189 | A | * | 11/1988 | Bugg .......................... 403/264 |
| 4,869,614 | A | * | 9/1989 | Fisher ............................ 403/8 |
| 5,190,392 | A | * | 3/1993 | Parma et al. ................ 403/171 |
| 5,375,923 | A | * | 12/1994 | Hall et al. .................. 312/348.4 |
| 5,590,975 | A | * | 1/1997 | Horntvedt .................... 403/320 |
| 5,647,174 | A | * | 7/1997 | Mattarelli .................... 52/36.3 |
| 6,890,121 | B2 | * | 5/2005 | Mauri ........................ 403/231 |
| 7,004,455 | B2 | * | 2/2006 | Pilja .......................... 254/13 |
| 7,159,288 | B2 | * | 1/2007 | Van De Loo et al. ........ 29/238 |
| 2007/0252318 | A1 | * | 11/2007 | Dorney et al. ............... 269/165 |
| 2009/0074505 | A1 | * | 3/2009 | Pilja .......................... 403/297 |
| 2010/0296861 | A1 | * | 11/2010 | Pilja .......................... 403/287 |

* cited by examiner

*Primary Examiner* — Joshua Kennedy
(74) *Attorney, Agent, or Firm* — Akerman Senterfitt

(57) ABSTRACT

An adjustable joining assembly having a particular application in knock down furniture, the joiner having a channel position on its lower surface that allows the joining to locate itself on to a screw thread and direct the screw thread towards an internal threaded gear section which upon rotation of the gear section provides a tightening of the joiner.

12 Claims, 11 Drawing Sheets

INTEGRATED JOINER IMPROVEMENTS

FIELD OF THE INVENTION

The present invention relates to a joiner or joining assembly for use in joining one article to another, in particular the joining of furniture parts.

DESCRIPTION OF THE PRIOR ART

Joiners and joining assemblies are used to assist in the holding of one section of furniture to another. For example, joining assemblies are used in furniture, stair banisters, bench tops etc. Knock down furniture is an area in which joining assemblies are quite often used, where furniture sections are pre-drilled to accept certain joining assemblies, then flat-packed and transported for sale. The end purchaser then having the task of assembling the furniture making use of the pre-drilled holes to insert the relative joining assemblies.

Most joining assemblies used in knock down furniture comprise two sections: the pin or insert, that is inserted into a pre-drilled hole in one section of furniture; and a tightening element, that is inserted into a pre-drilled aperture on the second piece of furniture that engages a head of the pin and then is rotated to engage and apply a pulling force through a camming action to draw the two pieces of furniture together.

Such joining assemblies however only provide a limited range of torque to the pin due to the relatively low range of camming action available.

OBJECT OF THE INVENTION

It is an object of the present invention to provide a joiner that provides a high degree of torque.

It is a further object of the invention to provide a joiner that has allocating feature to enable the joiner to be easily and quickly engage a shaft.

It is a further object to provide a joiner that will provide flexibility in the location of the hole that accommodates the joiner body.

A further object of the invention is to provide a joiner that has the ability to rotate a nut and shaft at a right angle to one another.

It is a further object to provide a joiner for knockdown furniture that is more forgiving in relation to the positioning of the holes that accommodate them.

It is an object of the present invention to overcome, or at least substantially ameliorate, the disadvantages and shortcomings of the prior art.

It is a further object of the invention to provide a joiner that can be used in tight positions where there is limited room.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as limiting the invention in any way, there is provided an adjustable joining assembly including a first clamping member that is inserted into an aperture in a first furniture part:

a. the first clamping member having a body, including a gear assembly having rotatable first and second gears members operatively connected with each other, in a substantially perpendicular arrangement, the first gear member having a tool engaging aperture thereon, the second gear member having an aperture with an internal thread to receive a threaded shaft therein;

b. the screw threaded shaft inserted into or connected into a second furniture part;

c. a retaining member, adapted to engage with the first clamping member to retain the second gear within the body of the clamping member, d. wherein the body of the clamping member has a channel in a bottom face to allow the clamping member to be placed over the threaded shaft protruding into the aperture in a second furniture part to assist in the location and engagement of the threaded shaft with the second gear member, and subsequent rotation of the first gear member effects rotation of the second gear member thus causing the clamping member to move along the threaded shaft.

In preference, the channel has a floor substantially aligned with the aperture of the second gear.

In preference the channel has a length that extends from an outer periphery of the body of the first clamping member to at least partially towards the aperture with the internal thread on the second gear.

In preference, the channel extends from an outer periphery of the body of the first clamping member to the aperture with the internal thread on the second gear.

In preference, the second gear captivity holds the first gear in a slot in the body of the first clamping member.

In preference, the channel floor has a substantially concave shape that nestingly fits an outer shape of the threaded shaft.

In preference, the first gear member is located directly above the channel of the bottom face.

This allows the first clamping member to be constructed in a compact small overall volume.

In preference, the first gear member is a flat gear.

In preference, the first gear member is positioned within a slot in the body of the first clamping member.

In preference, the slot is substantially parallel with the floor of the channel

In preference, the body of the clamping member has an aperture on an upper face to provide access to the tool-engaging aperture of the first gear member.

BRIEF DESCRIPTION OF THE DRAWINGS

By way of example, an employment of the invention is described more fully the renown for with reference to the accompanying drawings, in which.

DETAILED DESCRIPTION OF THE INVENTION

Figure 1:
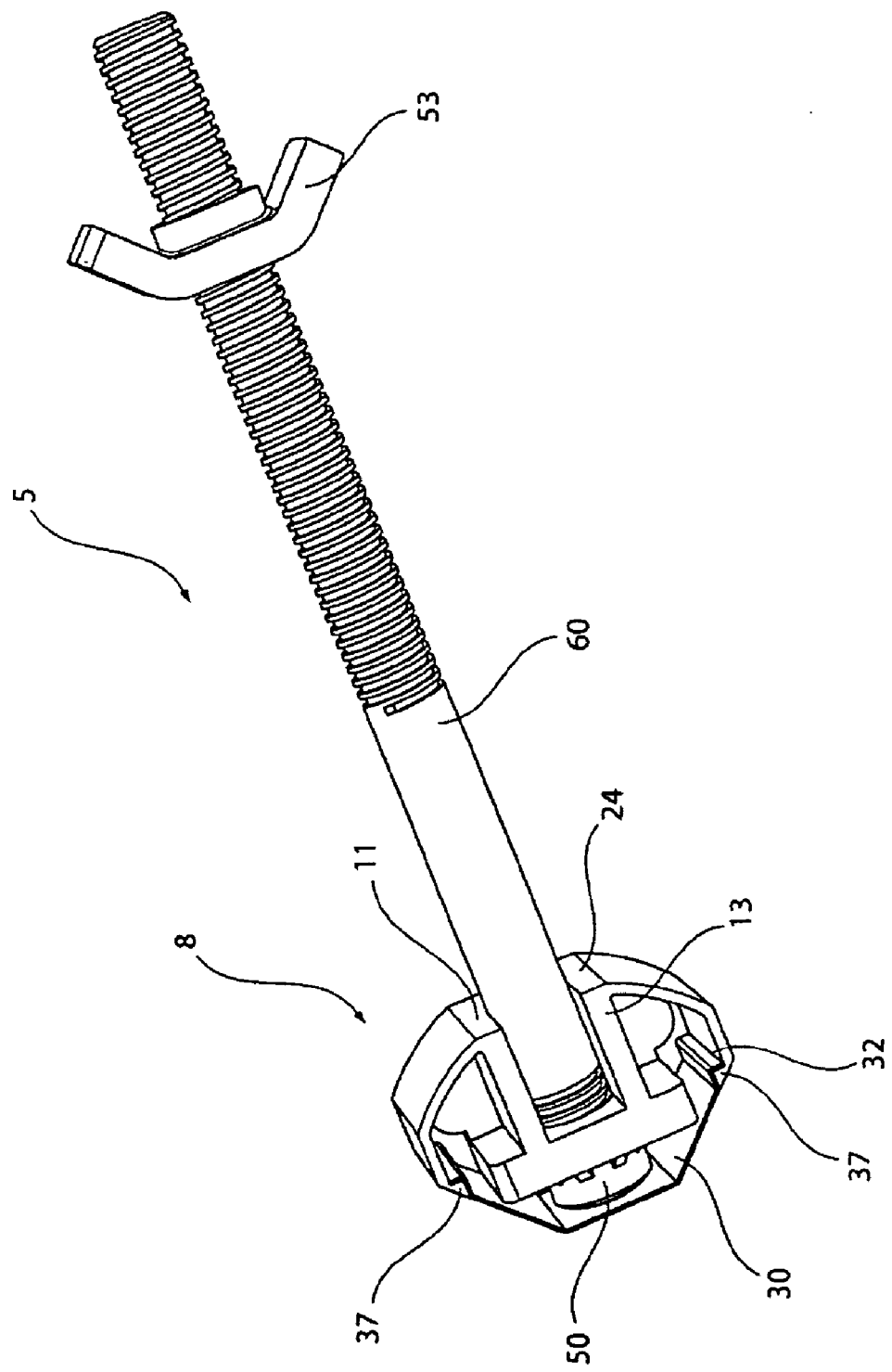
FIG. 1 is a underside elevation view according to a first embodiment of the joiner invention.
Figure 2:
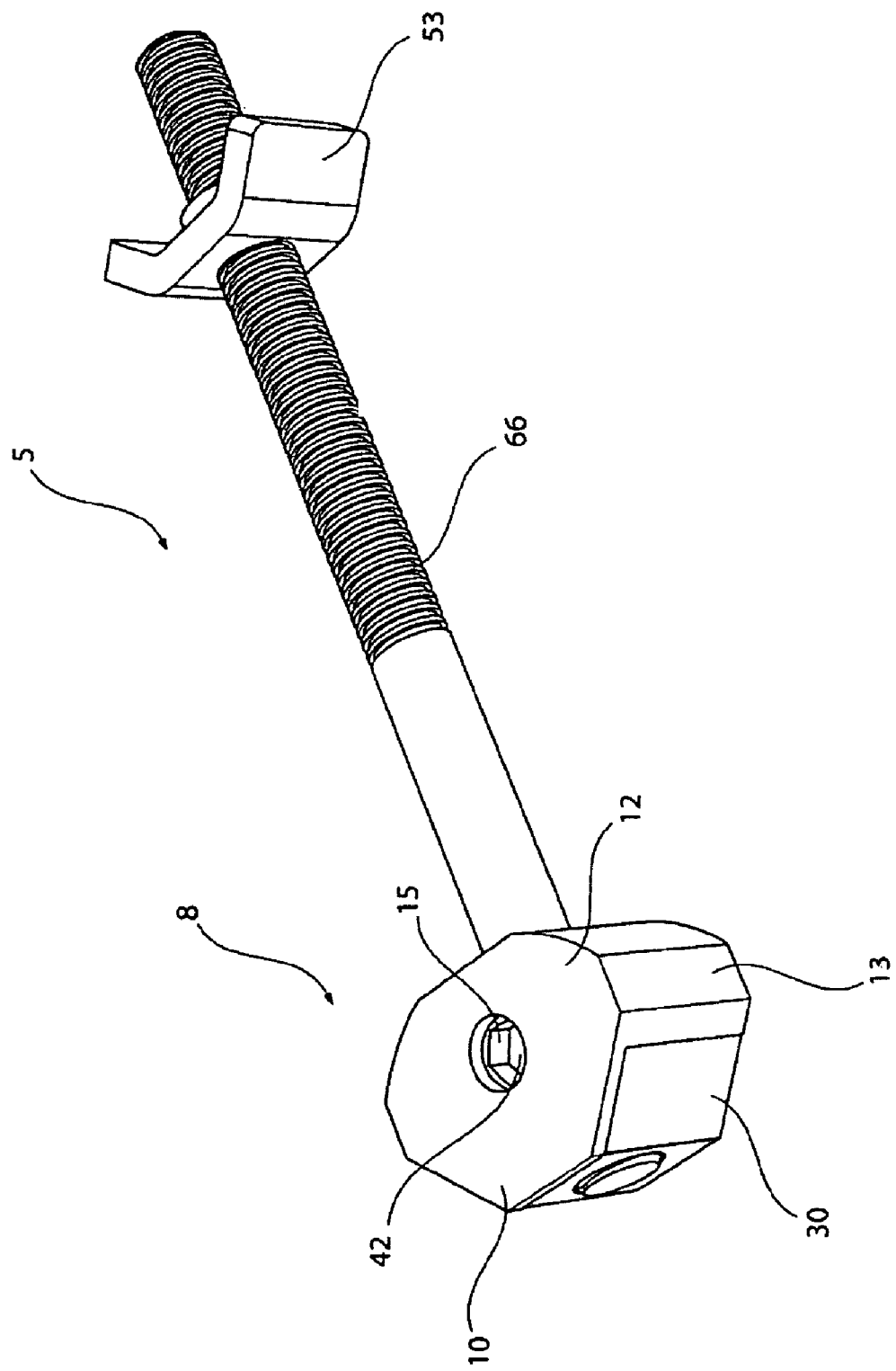
FIG. 2 is a upper elevation view of the joiner invention shown in FIG. 1.
Figure 3:
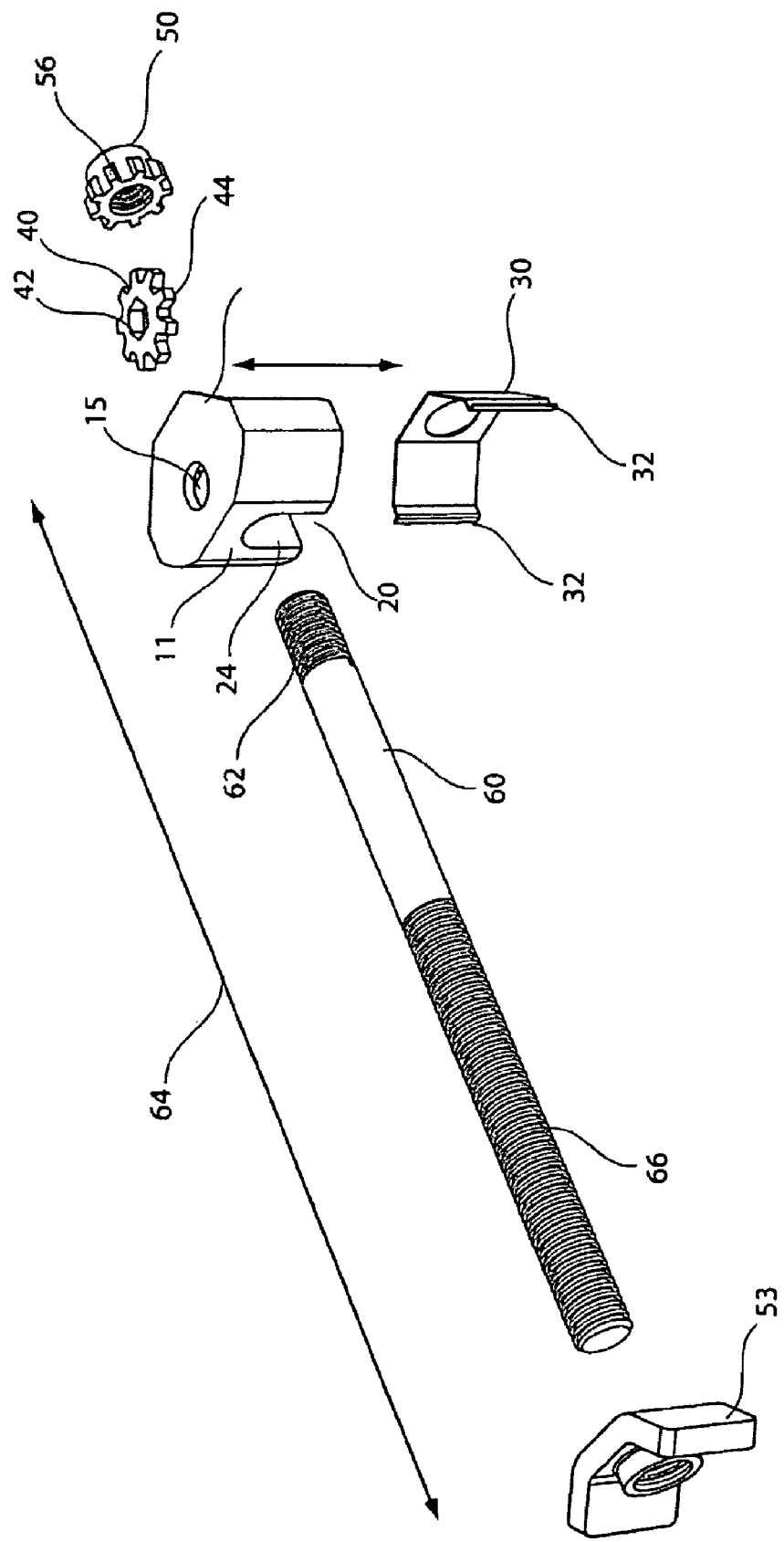
FIG. 3 is an front exploded view of the invention shown in FIG. 1 showing the components of the gears inside the joiner.
Figure 4:
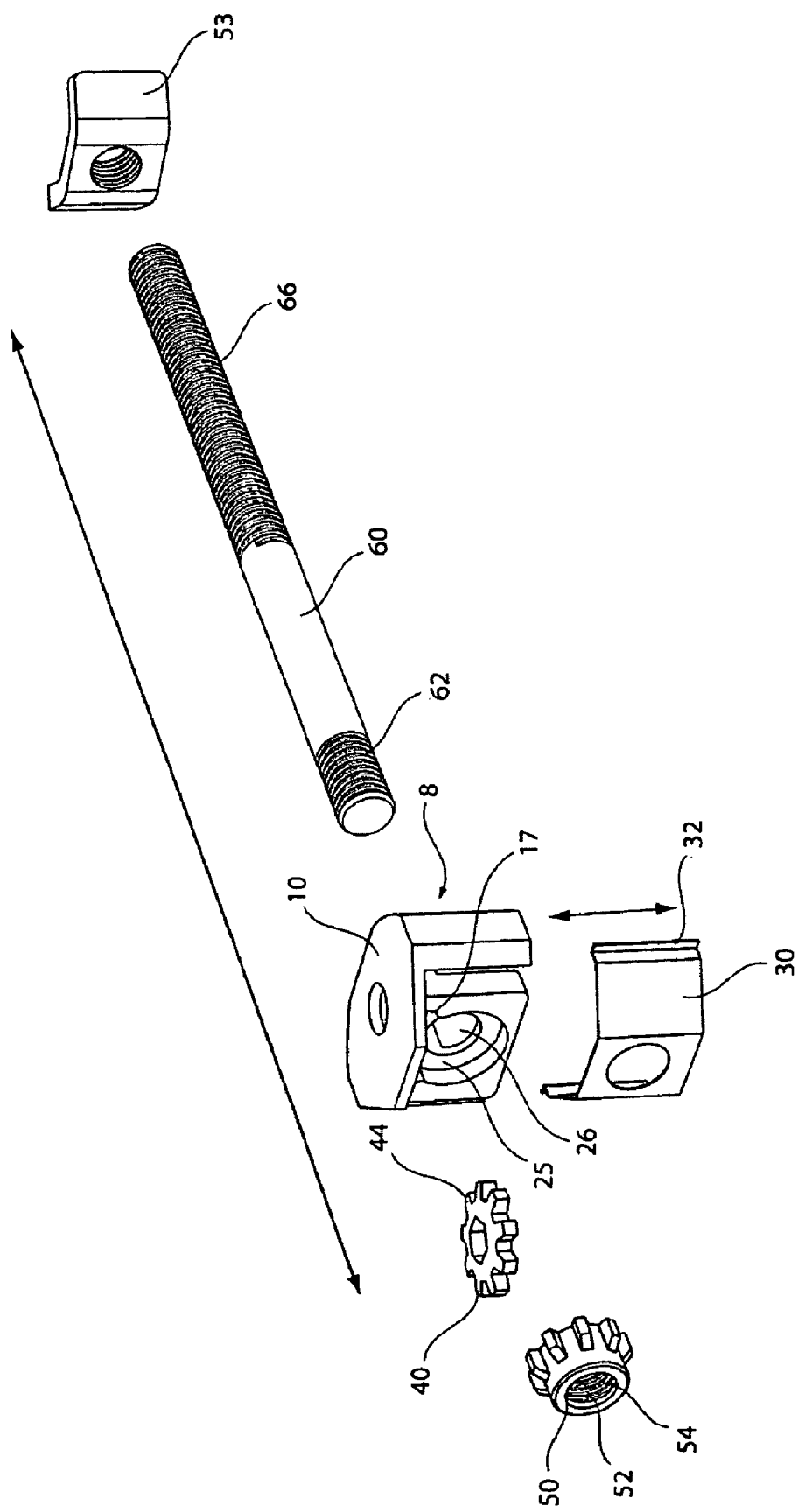
FIG. 4 is a rear exploded view of that shown in FIG. 3.

The adjustable joining assembly (5) has a first clamping member (8) having a body (10).

The body (10) itself includes a top surface (12) and a bottom surface (13) and houses a first gear member (40) and second gear member (50) within. The top surface (12) has an aperture (15) to provide access to the tool-engaging aperture (42) of the first gear member (40). The diameter of the aperture (15) should be sufficient to allow free movement of a tool within the aperture once it has engaged the tool-engaging aperture (42).

The first gear member (40) sits within a slot (17) within the body (10). The second gear member (50) is then located in the recess (25) so that the first and second gear members (40) and (50) respectively are in a substantially perpendicular relationship. The aperture (52) of the second gear member (50) is substantially aligned with the opening (26), which is in communication with the channel (20).

The channel (20) on the body (10) has a floor (22) that is of a substantially concave shape, although it could be flat, and there are sides (24). The floor (22) of the channel (20) is substantially aligned with a lower portion of the opening (26) and allows for a threaded shaft (60) to rest against it and guide the shaft (60) towards the internal thread (54) of the aperture (52) of second gear member (50).

The channel (20) can either penetrate substantially into the body (10) of the first clamping member (8) from the outer front face (11) or alternatively the channel (20) may penetrate only partially inwards from the front face (11) but the shaft (60) is still guided towards the internal thread (54) of the aperture (52). By reducing the length of the channel (20) the rigidity of the first clamping member (8) may be increased when constructed from materials having low tensile strength.

The second gear member (50) is held in place in the recess (25) by a retaining member (30), which has flanges (32) that engage with the flanges (37). The retaining member (30) can then slide into place to captively hold the second gear member (50). In this manner then, the second gear member (50) is held in operative engagement with the first gear member (40) so that gear teeth (56) and (44) intermesh and that rotation of the first gear member (40) via the tool engaging aperture (42) results in rotation of the second gear member (50) to effect movement of the clamping member (8) along the longitudinal length (64) of the threaded shaft (60).

In use, in knockdown furniture or similar, there is a second furniture part (80) and a first furniture part (85) to be joined together. The second furniture part (80) has a pin (70) inserted into a predrilled hole. The pin (70), FIG. 6, has a threaded shaft (60) with a fine threaded section (62) and a coarse threaded section (67) although other ways of attached the pin to the furniture part are not specifically excluded and those skilled in the art would understand that other methods of attaching the pin to the furniture could also be used, that would not require the use of a coarse thread. In some situations the pin may be held in place by a nut and washer or a second clamping member (53) may be used depending on the requirements of the joint to be fixed or secured together.

In the following description, two furniture parts are to be joined together using the adjustable joining assembly (5) as shown in FIG. 1 that is with the second clamping member (53) in place on the shaft (60). The second furniture part (80) has a pre-bored hole (72) with a perpendicular hole (73) drilled through from the front surface (75) to accept the shaft (60) within it. The second clamping member (53) is then screwed onto the traded shaft (60) as required, once the shaft 60 has entered into the aperture (72) via the hole (73). The second clamping member is then only wound onto the shaft (6) to ensure that it has engages the threads although it can be wound further as needed, The first furniture part (85) also has a predrilled or bored hole (81), typically with an internal diameter of approximately 25 mm, close to the edge (86) of the first furniture part (85) and having an aperture positioned to allow the aligned shaft (60), or pin, on the second furniture part (80) to enter into the hole (88) in the first furniture part (85). The two furniture pieces are then brought into alignment so that the shaft (60), in this case, is guided into the hole (88) and then the first clamping member (8) is then placed into in to the hole (81) in the first furniture part (85), the channel (20) being in an overlapping position with the thread (62) of the threaded shaft (60), so as to align the threaded aperture (52) of the second gear member (50) with the threaded shaft (60).

Figure 5A:
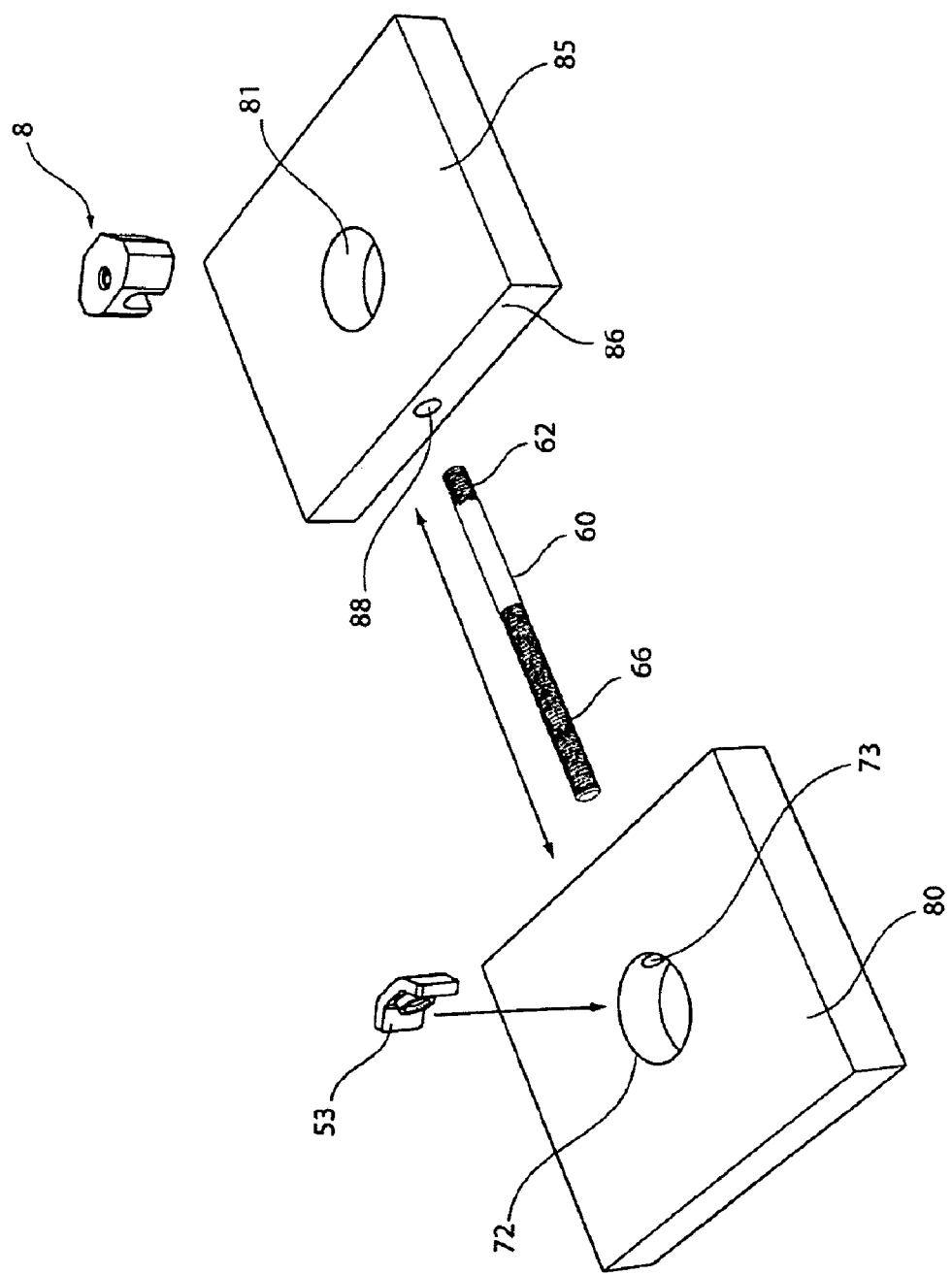
FIG. 5*a* is schematic showing the joiner of FIG. 1 prior to insertion into sections of furniture to be joined together.
Figure 5B:
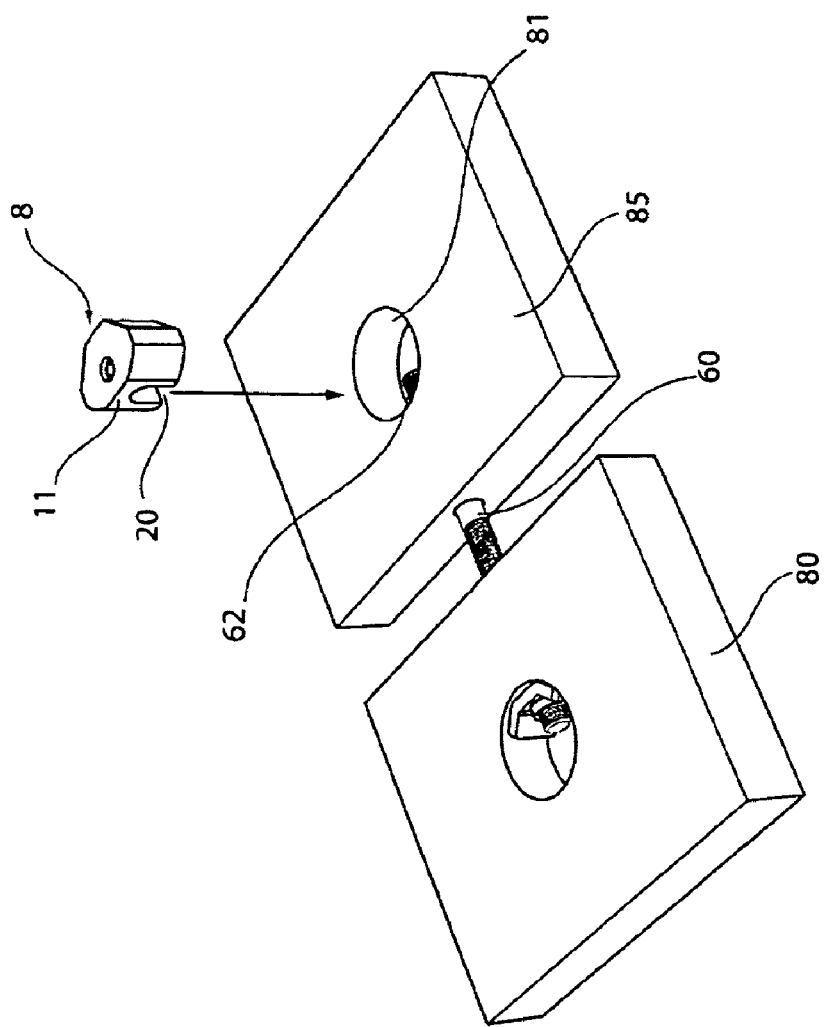
FIG. 5*b* shows the partially completed joiner of FIG. 5*a*, with only the clamping member yet to be inserted over the thread of the threaded shaft.
Figure 5C:
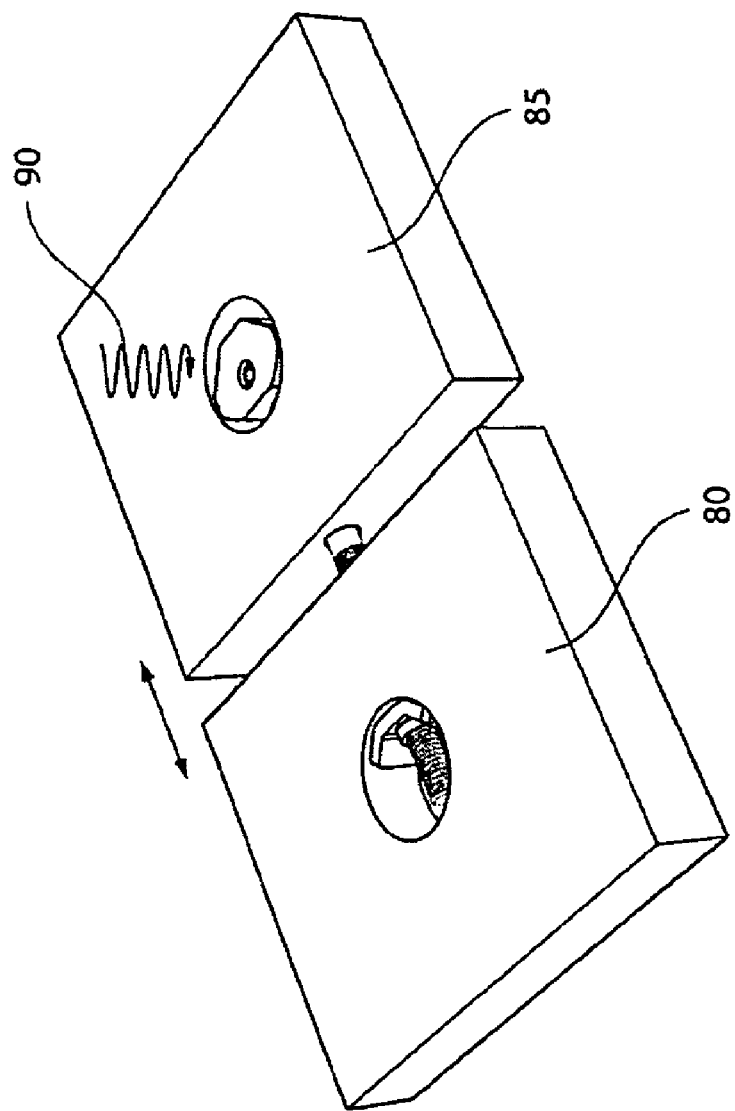
FIG. 5*c* shows the tightening of the joiner of FIG. 5*b*, bringing the two furniture pieces together.
Figure 5D:
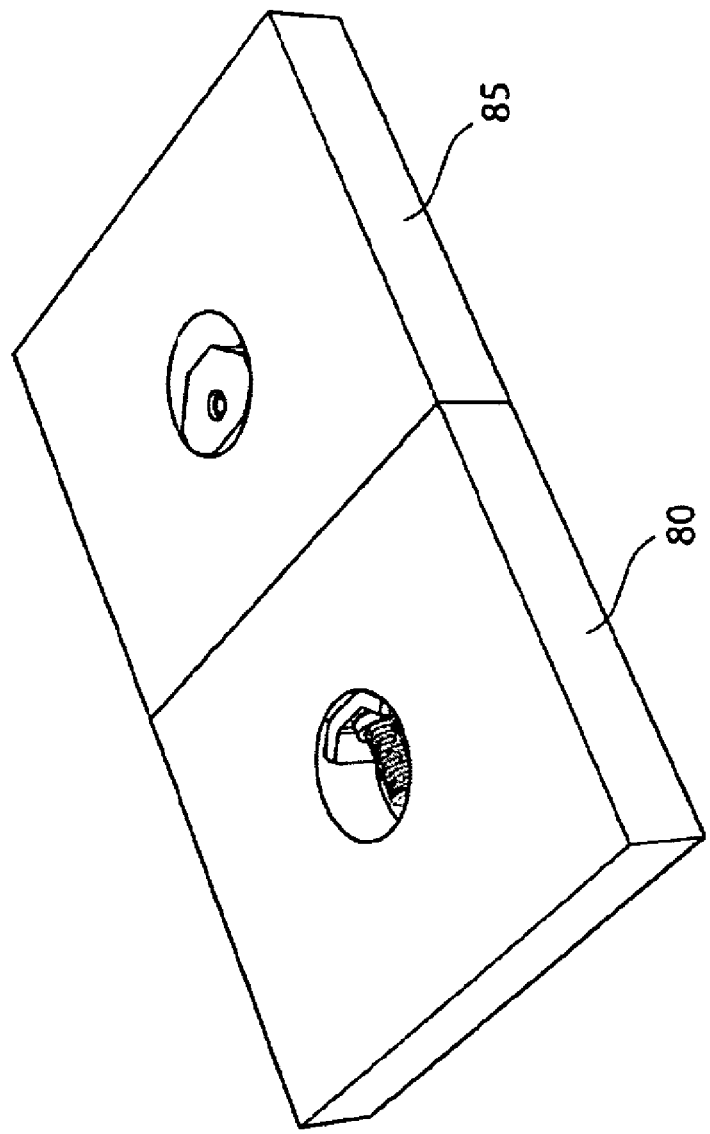
FIG. 5*d* shows the two furniture pieces of 5*c* now joined.
Figure 5E:
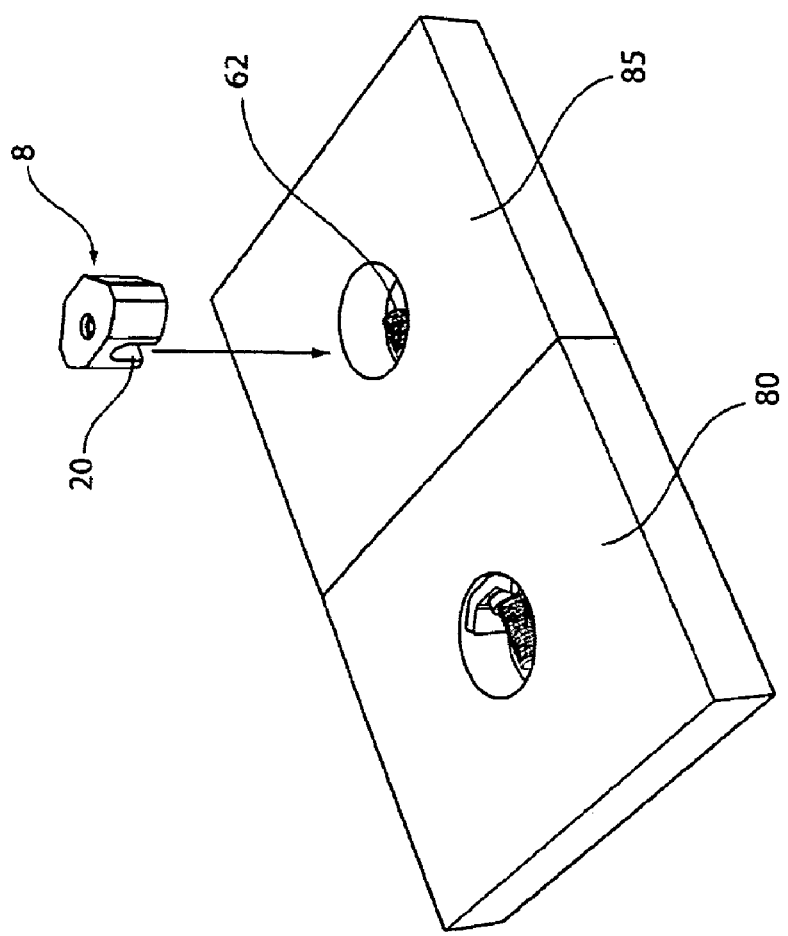
FIG. 5e shows that the joiner can be inserted directly over the threaded portion of the threaded shaft even when the two furniture parts are brought into close contact with one another.

The first clamping member (8) can then be moved to bring the thread (62) into engaging contact with the internal thread (54) of the second gear member (52). Rotation (90) of the first gear member (40), FIG. 5c, will then result the first clamping member (8) moving along the shaft (60) until it bottoms out on the threaded section (62) then the shaft (60) will be forced to rotate. As the second clamping member (53) cannot rotate then it will be forced to travel along the length of the shaft (60) to effect a tightening of the assembly, clamping the two furniture parts together in a secure manner, FIG. 5d.

The effect of the channel (20) is further noticed when the shaft (60) is of a certain length that allows the two furniture parts (80) and (85) to butt up together as close as possible, such as when using the pin (70). In such arrangements, the threaded portion (62) will project substantially into the hole (81) and the first clamping member (8) will then be able to placed directly over the threaded portion (62) bringing the thread into close proximity and engagement with the threaded aperture (5) of the second gear (50). Tightening of the joined then in the manner as described can then take place and the two furniture parts are then securely, but reversibly, clamped together. The use of the screw threaded shaft (60) provides greater torque than other mechanisms presently in use in the knockdown furniture assembly.

Figure 6:
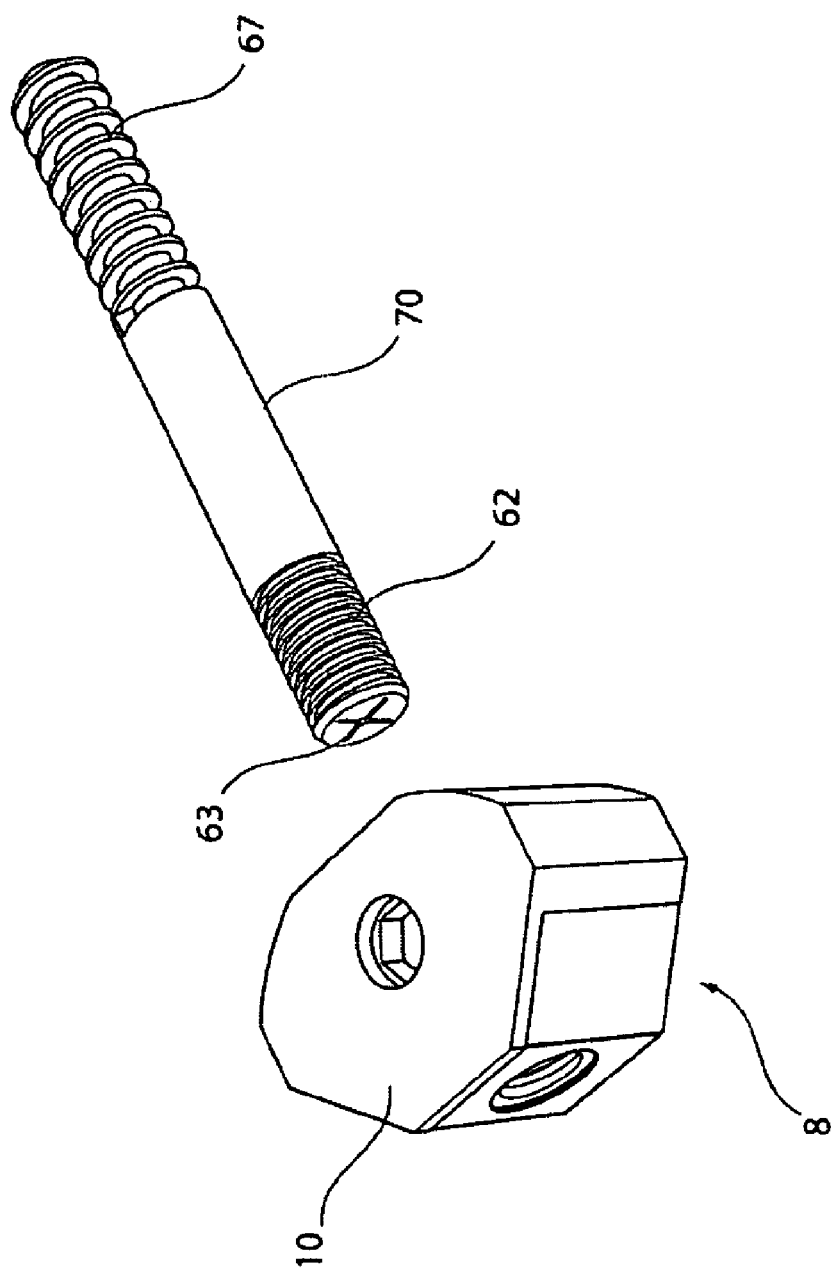
FIG. 6 shows the present invention with a different threaded shaft having an aggressive thread at an opposite end to the threaded portion that engages with the clamping member.

The channel (20) allows the first clamping member (8) be positioned over the threaded shaft (60) with little effort, thus making the assembly particularly in useful situations where there is minimal room for movement, or insertion, of a clamping assembly, FIG. 6.

This is particularly noticeable in knockdown furniture when the depth of the hole (81) that accommodates the first clamping member (8) is formed with a greater depth in the furniture part (85) than it should be. In such situations the pin (70) would not be positioned in the hole (81) and conventional joiners know in the art, which are inserted into the hole (81) prior to the insertion of the pin (70) into the hole (81) via the hole (88), do not align with the pin (70) as they are set back in the base of the hole (81) this requires a significant amount of extra work by the user to align the prior art joiner with the hole so that the pin can be mated to the joiner clamping member.

In the situation where a pin (70) of the type shown in FIG. 6 is used then it is first driven into the second furniture part (80) and then the threaded section (62) is aligned with the hole (88) of the first furniture part (85). In this instance, the threaded section (62) will travel further down the length of the shaft (70) so that when the tightening is effected there will be more movement of the first clamping member (8) along the threaded section (62), as the shaft (70) will not rotate once screwed into position.

With the present invention, the depth of the hole (81) is not as important, as the clamping member (8) is inserted into the hole (81) after the pin (70) has been inserted into hole (88) then the channel (20) can be placed directly over the shaft section (62) and thus engage the second gear member (50) quickly with little effort.

This is also true then if the hole (88) were inadvertently bored of centre relative to the hole (81) that accommodates the first clamping member (8).

Figure 7:
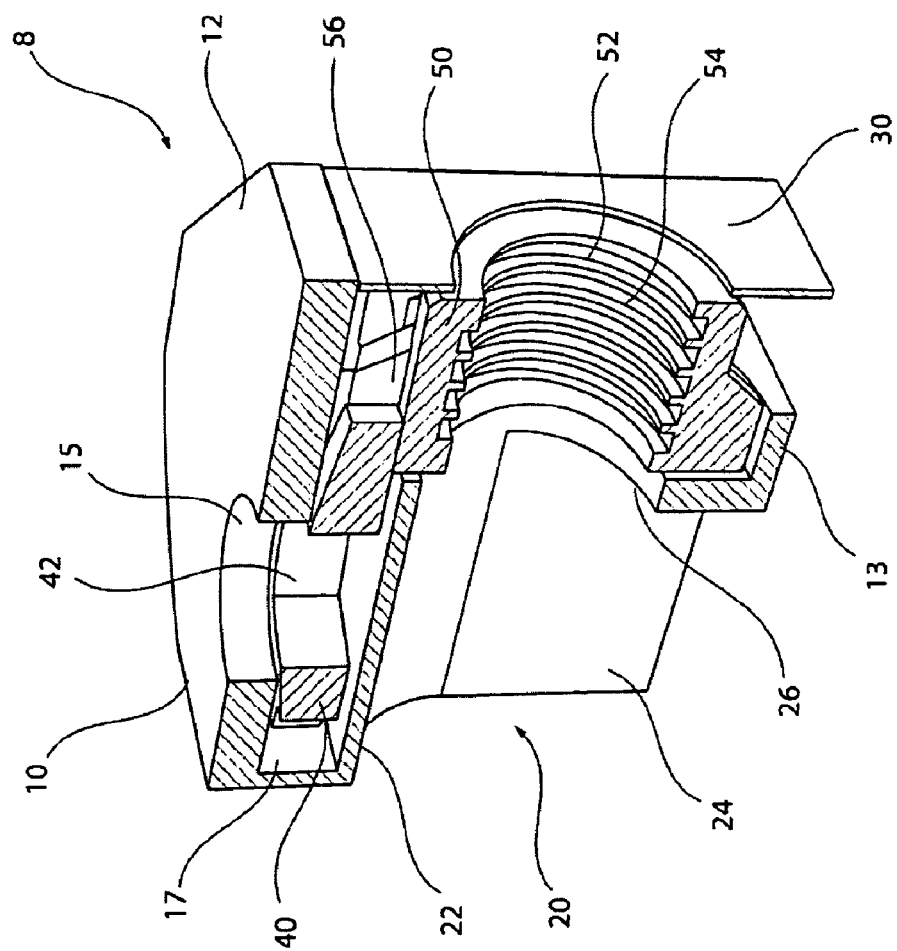
FIG. 7 shows a cross-section of the first clamping member without the shaft engaged in the second gear member.

The cross-sectional view, FIG. 7, shows the compact arrangement of the gear members (40) and (50) arranged approximately perpendicular with respect to each other. The slot (17) is where the first gear member is situated; the tool-engaging aperture (42) of the first gear (4) is located directly above the channel (2). This placement and arrangement of the gears (40) and (50) provides for a compact overall shape of the body (10) that allows it to easily fit within the standard 25 mm diameter hole pre-bored into knockdown furniture.

The channel (20), defined by the floor (22) and sides (24) as shown in FIG. 7, acts as a guide to the incoming threaded shaft to direct the threaded portion into contact with the internal thread (54) of the second gear member (50). The shaft then passes through the internal aperture (26) and is guided into intimate contact with the start of the internal thread (54), subsequent rotation of the second gear member (50) by rotation of the first gear member (40) results in an interlocking engagement of the internal thread (54) with the threads on the fixed shaft.

As would be apparent now the length of the channel (20) itself may be varied such that the channel may be considerably shorter in length, which would result in the opening (26) being further towards the front opening of the channel (20). This could also be useful if additional strength needed to be added to the joiner in other applications/material combinations.

The feature of the channel (20) allows the present invention (5) to be able to be placed over a threaded shaft in tight locations where the body of the joiner (10) may otherwise not have a significant amount of room to move to engage a threaded shaft. By quickly and easily locating onto the threaded shaft, subsequent engagement of the treaded shaft and the second gear member is greatly facilitated.

Although the invention has been herein shown and described in what is conceived to be the most practical and preferred embodiment, it is recognized that departures can be made within the scope of the invention, which is not to be limited to the details described herein but it is to be accorded the full scope of the appended claims so as to embrace any and all equivalent devices and apparatus.

The invention claimed is:

1. An adjustable joining assembly including a first clamping member that is inserted into an aperture in a first furniture part:
   the first clamping member having a body, including a gear assembly having rotatable first and second gear members operatively connected with each other, in a substantially perpendicular arrangement, the first gear member having a tool engaging aperture thereon, the second gear member having an aperture with an internal thread to receive a first threaded end of a threaded shaft therein;
   a second threaded end of the threaded shaft interconnected with a second furniture part via a second clamping member, the second clamping member having an internal thread set;
   a retaining member, adapted to engage with the first clamping member to retain the second gear member within the body of the first clamping member,
   wherein the body of the first clamping member has a channel in a bottom face to allow the first clamping member to be placed over the threaded shaft protruding into the aperture in the first furniture part to assist in the location and engagement of the threaded shaft with the second gear member, and subsequent rotation of the first gear member effects rotation of the second gear member thus causing the first clamping member to move along the first threaded end of the threaded shaft until threads of the first threaded end run out causing the first clamping member to bottom out on the first threaded end and the second threaded end of the threaded shaft is then forced to rotate within the internal thread set of the second clamping member and tighten the first and second furniture parts as the second clamping member moves along the second threaded end of the threaded shaft.

2. The adjustable joining assembly of claim 1, wherein the channel has a floor substantially aligned with the aperture of the second gear member.

3. The adjustable joining assembly of claim 2, wherein the channel has a length that extends from an outer periphery of the body of the first clamping member to at least partially towards the aperture with the internal thread on the second gear member.

4. The adjustable joining assembly of claim 3, wherein the channel extends from an outer periphery of the body of the first clamping member to the aperture with the internal thread on the second gear member.

5. The adjustable joining assembly of claim 4, wherein the second gear captively holds the first gear member in a slot in the body of the first clamping member.

6. The adjustable joining assembly of claim 5, wherein the channel floor has a substantially concave shape that nestingly fits an outer shape of the threaded shaft.

7. The adjustable joining assembly of claim 6, wherein the first gear member is located directly above the channel of the bottom face.

8. The adjustable joining assembly of claim 7, wherein the first gear member is a flat gear.

9. The adjustable joining assembly of claim 8, wherein the first gear member is positioned within a slot in the body of the first clamping member.

10. The adjustable joining assembly of claim 9, wherein the slot is substantially parallel with the floor of the channel.

11. The adjustable joining assembly of claim 10, wherein the body of the clamping member has an aperture on an upper face to provide access to the tool-engaging aperture of the first gear member.

12. The adjustable joining assembly of claim 1, wherein the second gear captively holds the first gear member in a slot in the body of the first clamping member.

* * * * *